(12) United States Patent
Popov et al.

(10) Patent No.: US 12,223,983 B1
(45) Date of Patent: Feb. 11, 2025

(54) DATA STORAGE DEVICE WITH WRITE CACHING FOR MAXIMIZING DISK ACCESS DURING LASER DIODE STEADY STATE

(71) Applicant: WESTERN DIGITAL TECHNOLOGIES, INC., San Jose, CA (US)

(72) Inventors: Zarko Popov, Mission Viejo, CA (US); Andrew Larson, Rochester, MN (US); Wayne H. Vinson, Longmont, CO (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/586,452

(22) Filed: Feb. 24, 2024

(51) Int. Cl.
   *G11B 20/12* (2006.01)
   *G11B 5/00* (2006.01)
   *G11B 5/55* (2006.01)

(52) U.S. Cl.
   CPC ........ *G11B 20/1251* (2013.01); *G11B 5/5547* (2013.01); *G11B 2005/0021* (2013.01); *G11B 2020/1242* (2013.01)

(58) Field of Classification Search
   CPC .............. G11B 20/1251; G11B 5/5547; G11B 2005/0021; G11B 2020/1242
   See application file for complete search history.

(56) References Cited

U.S. PATENT DOCUMENTS

| | | | |
|---|---|---|---|
| 9,153,290 B1 * | 10/2015 | Bandic | G11B 5/012 |
| 9,281,659 B1 | 3/2016 | Tatah et al. | |
| 9,418,699 B1 * | 8/2016 | Gibbons | G11B 20/1217 |
| 9,916,851 B1 | 3/2018 | Seigler et al. | |
| 9,972,344 B2 | 5/2018 | Ruan et al. | |
| 10,283,149 B2 | 5/2019 | Lamberts et al. | |
| 10,720,177 B1 | 7/2020 | Ng et al. | |
| 11,694,717 B1 | 7/2023 | Popov et al. | |
| 2014/0029396 A1 | 1/2014 | Rausch et al. | |
| 2019/0205041 A1 * | 7/2019 | Lin | G06F 3/0632 |

(Continued)

OTHER PUBLICATIONS

Granz et al., "Heat-Assisted Interlaced Magnetic Recording", https://ieeexplore.ieee.org/document/8027105, dated Sep. 7, 2017; 4 Pages.

(Continued)

*Primary Examiner* — Andrew Sasinowski
(74) *Attorney, Agent, or Firm* — Calderon Safran & Wright P.C.

(57) ABSTRACT

Various illustrative aspects are directed to a data storage device, method, and one or more processing devices that are configured to: maintain respective measures of write commands associated with respective ones of shingled magnetic recording (SMR) zones defined in a data storage device, wherein data associated with the write commands is stored in a write cache associated with the data storage device; select one of the SMR zones based on the respective measures; perform a pre-heat operation of a laser diode included in a head associated with the selected one of the SMR zones; and perform a continuous write operation in the selected one of the SMR zones following the pre-heat operation, wherein the continuous write operation writes at least a portion of data stored in the write cache associated with the selected one of the SMR zones.

20 Claims, 5 Drawing Sheets

(56) References Cited

U.S. PATENT DOCUMENTS

2022/0301586 A1* 9/2022 Kimura ................. G11B 5/012
2022/0301589 A1* 9/2022 Obuchi ............... G11B 5/4806

OTHER PUBLICATIONS

Sun et al., "A Universal SMR-aware Cache Framework with Deep Optimization for DM-SMR and HM-SMR Disks", https://dl.acm.org/doi/abs/10.1145/3588442, dated Jun. 19, 2023; 5 Pages.
Yang et al., "On Improving the Write Responsiveness for Host-Aware SMR Drives" https://ieeexplore.ieee.org/ielaam/12/8572815/8387485-aam.pdf, Nov. 13, 2017; 15 Pages.

\* cited by examiner

DATA STORAGE DEVICE WITH WRITE CACHING FOR MAXIMIZING DISK ACCESS DURING LASER DIODE STEADY STATE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

Figure 1:
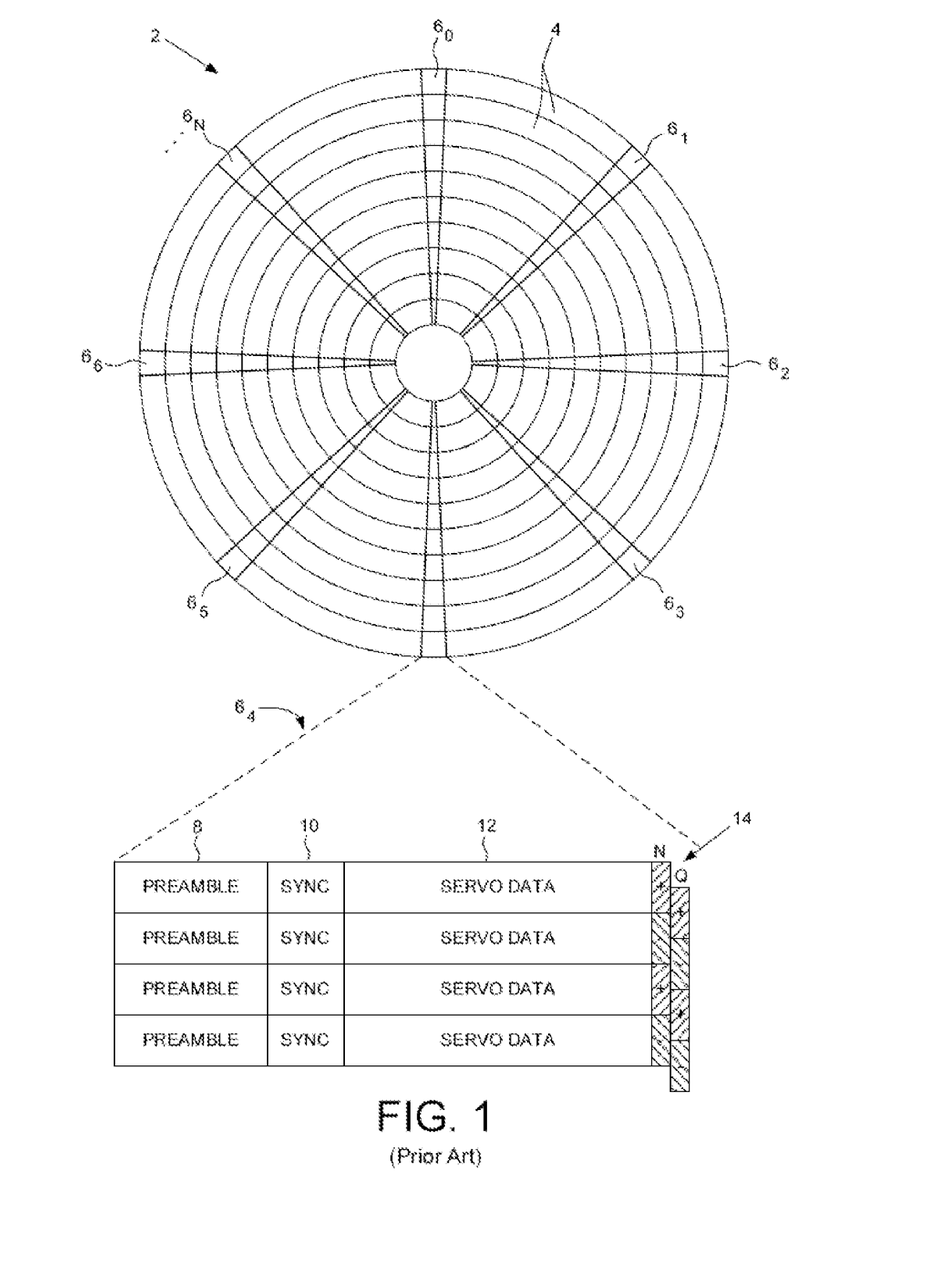
FIG. 1 shows a prior art disk format as comprising a number of radially-spaced, concentric servo tracks defined by servo wedges recorded around the circumference of each servo track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as shingled magnetic recording (SMR) hard disk drives with control circuitry configured to perform novel and inventive write caching methods for maximizing disk access during laser diode steady state thermal condition. In various examples, control circuitry of this disclosure is inventively configured to: define a limited number of open SMR zones for a disk drive; accumulate write commands in a write cache for each of the open SMR zones; select one of the open SMR zones having a largest number (or largest volume) of write commands in the write cache; pre-heat a laser diode of a head associated with the selected one of the open SMR zones to a steady state thermal condition; and perform a portion of the write commands in the write cache associated with the selected one of the open SMR zones while maintaining the laser diode in the steady state thermal condition. In this manner, implementations maximize a number of write commands performed per pre-heat operation, which in turn reduces pre-heat performance loss in heat-assisted magnetic recording (HAMR) disk drives.

Various illustrative aspects are directed to a data storage device, comprising one or more disks; an actuator mechanism configured to position one or more heads proximate to a corresponding disk surface of a corresponding disk of the one or more disks; and one or more processing devices. The one or more processing devices, individually or in combination, are configured to: maintain respective measures of write commands associated with respective ones of shingled magnetic recording (SMR) zones defined in the data storage device, wherein data associated with the write commands is stored in a write cache associated with the data storage device; select one of the SMR zones based on the respective measures; perform a pre-heat operation of a laser diode included in a head associated with the selected one of the SMR zones; and perform a continuous write operation in the selected one of the SMR zones following the pre-heat operation, wherein the continuous write operation writes at least a portion of data stored in the write cache associated with the selected one of the SMR zones.

Various illustrative aspects are directed to a method comprising: maintaining respective measures of write commands associated with respective ones of shingled magnetic recording (SMR) zones defined in a data storage device, wherein data associated with the write commands is stored in a write cache associated with the data storage device; selecting one of the SMR zones based on the respective measures; performing a pre-heat operation of a laser diode included in a head associated with the selected one of the SMR zones; and performing a continuous write operation in the selected one of the SMR zones following the pre-heat operation, wherein the continuous write operation writes at least a portion of data stored in the write cache associated with the selected one of the SMR zones, wherein the maintaining, the selecting, the performing the pre-heat operation, and the performing the continuous write operation are performed by one or more processing devices individually or in combination.

Various illustrative aspects are directed to one or more processing devices comprising: means for maintaining respective measures of write commands associated with respective ones of shingled magnetic recording (SMR) zones defined in a data storage device, wherein data associated with the write commands is stored in a write cache associated with the data storage device; means for selecting one of the SMR zones based on the respective measures; means for performing a pre-heat operation of a laser diode included in a head associated with the selected one of the SMR zones; and means for performing a continuous write operation in the selected one of the SMR zones following the pre-heat operation, wherein the continuous write operation writes at least a portion of data stored in the write cache associated with the selected one of the SMR zones.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 2A:
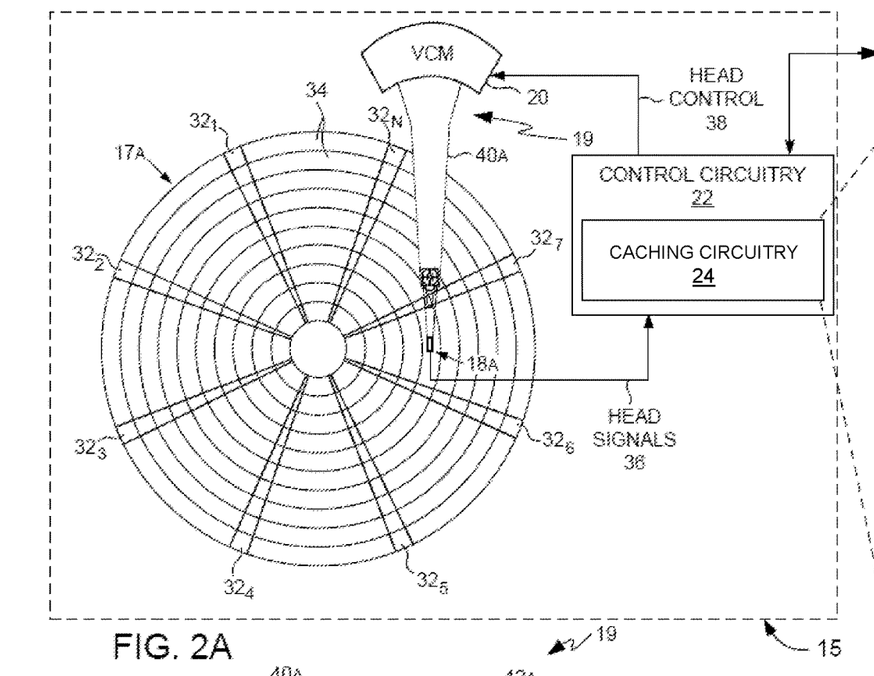
FIGS. 2A and 2B illustrate conceptual block diagrams of a top view and a side view of a data storage device in the form of a disk drive, in accordance with aspects of the present disclosure.
Figure 2B:
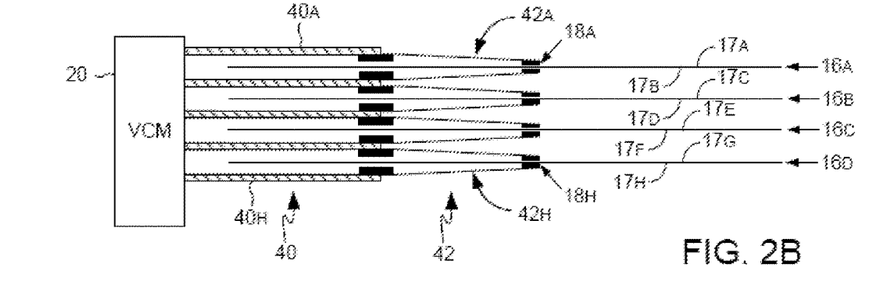
Figure 2C:
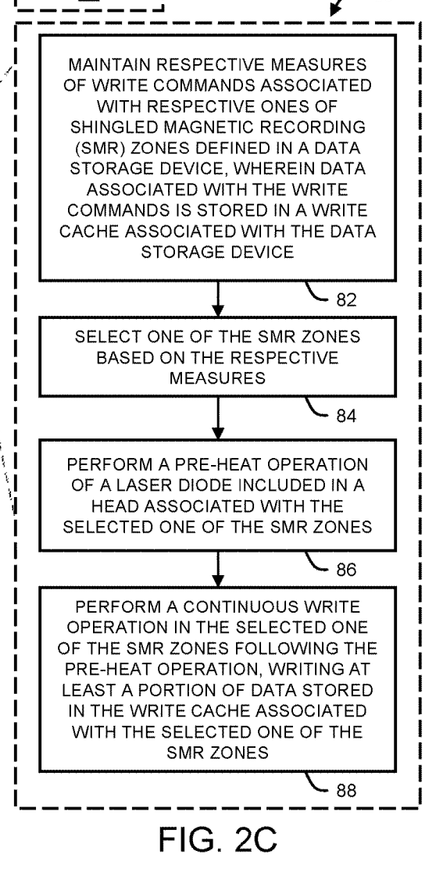
FIG. 2C depicts a flowchart for an example method that read/write channel circuitry of control circuitry of a disk drive may perform or execute in controlling the operations of the disk drive, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that caching circuitry 24 of control circuitry 22 may perform or execute in controlling the operations of disk drive 15, in accordance with aspects of the present disclosure, including write caching methods for maximizing disk access during laser diode steady state thermal condition while avoiding mode hop.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, caching circuitry 24 of control circuitry 22 may maintain respective measures of write commands associated with respective ones of shingled magnetic recording (SMR) zones defined in a data storage device, wherein data associated with the write commands is stored in a write cache associated with the data storage device (82). Caching circuitry 24 may further select one of the SMR zones based on the respective measures (84). Control circuitry 22 may further perform a pre-heat operation of a laser diode included in a head associated with the selected one of the SMR zones (86). Control circuitry 22 may further perform a continuous write operation in the selected one of the SMR zones following the pre-heat operation, wherein the continuous write operation writes at least a portion of data stored in the write cache associated with the selected one of the SMR zones (88). Control circuitry 22, including caching circuitry 24, may further perform additional actions, methods, and techniques, in accordance with various aspects including as further described herein.

The term "caching circuitry 24" as used herein may refer to any hardware, firmware, software, and/or combination thereof, comprised in control circuitry 22 of disk drive 15, which implements, embodies, or engages in any of the structures or functions ascribed herein to caching circuitry 24 or to any other of the novel and inventive aspects of the present disclosure. Caching circuitry 24 may constitute any hardware, firmware, software, and/or any other elements of control circuitry 22 for performing write caching methods for maximizing disk access during laser diode steady state thermal condition while avoiding mode hop, and performing other techniques and methods as described herein.

In embodiments, disk drive 15 comprises a heat-assisted magnetic recording (HAMR) SMR disk drive. SMR disk drives provide for higher areal density, and thus greater capacity, than conventional magnetic recording (CMR) disk drives. SMR disk drives achieve this by writing data sequentially and then overlapping (or "shingling") it with another track of data. The write head used in SMR disk drives is wider than required to read a single track of data. Once one track has been written, the head is advanced only part of its width so that the next track will partially overwrite the previous one, leaving only a narrow band of the previous track for reading. In a SMR disk drive, overlapping tracks are grouped into bands called zones. Because of the shingled format of SMR, all data streams are written sequentially to the media. Consequently, should a particular track need to be modified or re-written, the entire zone must be rewritten. Because the modified data is potentially under another "shingle" of data, direct modification is not permitted, unlike traditional CMR disk drives.

HAMR disk drives enable high-quality written data at high densities enabled by a high-coercivity medium of a disk surface, such as, e.g., superparamagnetic iron-platinum nanoparticles, by heating the disk surface with a laser emitted by a laser diode during write operations. Such heating of the disk surface decreases the coercivity of the magnetic medium of the disk surface, thereby enabling the magnetic field generated by the write coil of a write element to magnetize the temporarily heated area of the disk surface. The disk surface encoding the data thus written then cools back down and thereby returns to heightened magnetic coercivity, which durably preserves the written data at higher density than is possible in conventional techniques such as perpendicular magnetic recording (PMR).

Figure 3:
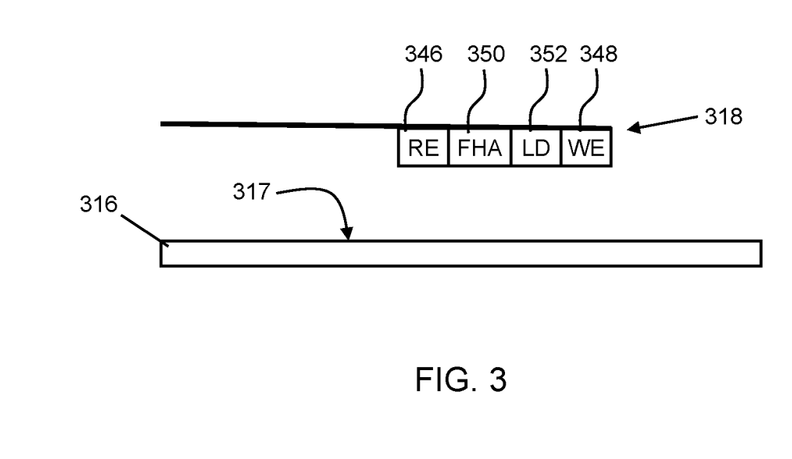
FIG. 3 depicts a head relative to a disk in accordance with various aspects of this disclosure.

FIG. 3 depicts an example head 318 usable in a HAMR disk drive. In particular, FIG. 3 shows a disk 316 that corresponds to one of disks 16 of FIG. 2B and a head 318 that corresponds to one of heads 18 of FIG. 2B. The arrangement or disposition of elements of heads 18 of FIG. 2B described herein is not limited to any specific detail as shown in FIG. 3, and the elements of heads 18 of FIG. 2B may be arranged in any of a variety of other configurations in other examples.

With continued reference to FIG. 3, in embodiments head 318 includes a read element 346 (e.g., a magnetoresistive (MR) element), a write element 348 (e.g., an inductive write coil), a fly height actuator 350 (e.g., a thermal fly height control (TFC) element that actuates through thermal expansion or a piezoelectric actuator that actuates through mechanical deflection), and a laser diode 352. Control circuitry 22 (shown in FIG. 2A) writes data to disk surface 317 by modulating a write current in an inductive write coil in write element 348 to record magnetic transitions onto corresponding disk surface 317 in a process referred to as saturation recording. During readback, read element 346 senses the magnetic transitions, and a read channel demodulates the resulting read signal. Control circuitry may use fly height actuator 350 to induce changes in the fly height of head 318 above disk surface 317. Laser diode 352 may be used to generate a laser that is used to temporarily heat an area of disk surface 317 prior to passing under write element 348, as is understood in a HAMR disk drive. For example, laser diode 352 may be used with a waveguide and a near-field transducer (NFT) to project a plasmon onto disk surface 317 to heat an area of disk surface 317.

HAMR disk drives are susceptible to the phenomenon of mode hop (also called mode hopping) in which the output of the laser diode (such as laser diode 352) changes based in part on a change of temperature of the laser diode. In one example, mode hop can be caused by crossing a thermal boundary at which the geometry of the laser diode changes. Mode hop can cause sudden and unpredictable changes in write width during a write operation, which may result in unwanted erasing of data in adjacent tracks, thus presenting a challenge to increasing areal density in the form of tracks per inch (TPI). Mode hop can also cause undesirable data integrity issues due to introducing a signal phase change at a mid-sector location on the disk surface. It is therefore desirable to minimize mode hop.

Embodiments recognize that one way to minimize or avoid mode hop to is maintain the laser diode (such as laser diode 352) at a relatively constant temperature, thereby avoiding temperature changes of the laser diode that can cause mode hop. One way to maintain the laser diode at a relatively constant temperature is to pre-heat the laser diode to a steady state thermal condition. Pre-heating the laser diode may be accomplished by performing a pre-heat operation that raises a temperature of the laser diode. This can be accomplished, in one example, using self-heating of the laser diode since the laser diode generates heat when emitting a laser. For example, a pre-heat operation may comprise applying a current to the laser diode that causes a temperature of the laser diode to increase due to self-heating.

Figure 4:
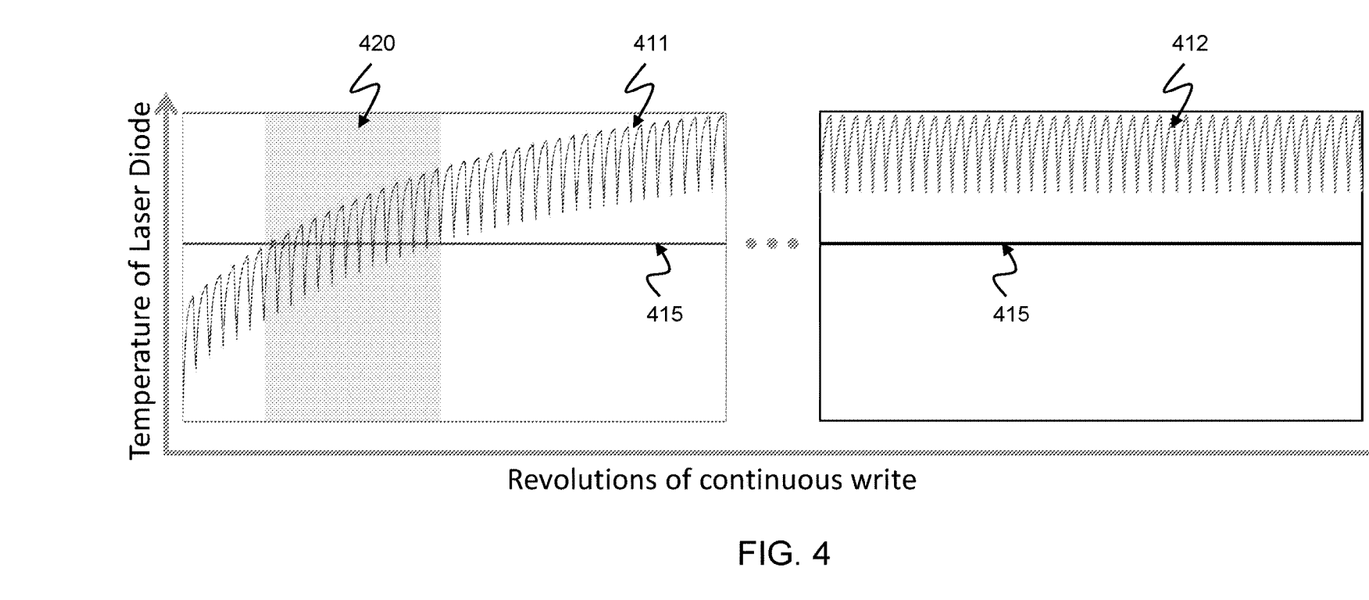
FIG. 4 shows exemplary plots of temperature of a laser diode versus time during different revolutions of a disk during a continuous write operation to plural data sectors in the disk.

FIG. 4 shows exemplary plots 411 and 412 of temperature of a laser diode versus time during different revolutions of a disk during a continuous write operation to plural data sectors in the disk (such as disk 316 of FIG. 3). In FIG. 4, the vertical axis represents the temperature of the laser diode (e.g., such as laser diode 352 of head 318 over disk 316, as shown in FIG. 3), and the horizontal axis represents time which may be expressed in revolutions of the disk during continuous write. Plot 411 shows the temperature of the laser diode during a first revolution of the disk during the continuous write operation, in which the temperature of the laser diode increases through a mode hop threshold temperature 415 at which mode hop occurs due to the changing temperature of the laser diode. With continued reference to plot 411, sector IDs of the disk corresponding to area 420 are affected by mode hop that occurs due to the temperature of the laser diode changing to values above and below the mode hop threshold temperature 415 while writing to these sectors. Plot 412 shows the temperature of the laser diode during an Nth revolution of the disk (e.g., any revolution after the first revolution) during the continuous write operation, in which the temperature of the laser diode remains in a steady state thermal condition above the mode hop threshold temperature 415. With continued reference to plot 412, mode hop does not occur in any of the sectors being written to during the Nth revolution because the temperature of the laser diode stays above, i.e., avoids crossing, the mode hop threshold temperature 415 at all times during the write operation. In this manner, performing the pre-heat operation of the laser diode raises a temperature of the laser diode to a steady state thermal condition corresponding to a mode hop resistant temperature.

Figure 5:
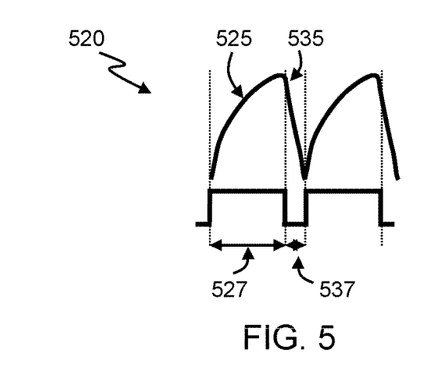
FIG. 5 shows a magnified view of a portion of one of the plots of FIG. 4.

FIG. 5 shows a magnified view of a portion of plot 412. FIG. 5 shows a temperature profile 520 having a 'shark fin' shape that results from repeated heating and cooling of the laser diode while the head travels over data sectors and servo sectors on the disk. In particular, a write portion 525 of temperature profile 520 shows the temperature of the laser diode increases as current is applied to the laser diode while the head is writing to a data sector represented by time range 527. Conversely, a non-write portion 535 of temperature profile 520 shows the temperature of the laser diode decreases while current is not applied to the laser diode while the head travels over a servo sector represented by time range 537. To avoid mode hop when writing to a particular data sector of the disk, the entirety of write portion 525 of temperature profile 520 should remain above the mode hop threshold temperature 415. In situations where there are plural different mode hop threshold temperatures, the entirety of write portion 525 of temperature profile 520 should avoid crossing any of the plural different mode hop threshold temperatures in order to avoid mode hop during writing to a data sector.

Embodiments avoid mode hop during a write operation by pre-heating the laser diode during one or more revolutions immediately preceding the write operation. In this manner, the entirety of the write operation is performed while the laser diode is at a steady state thermal condition in which the temperature of the laser diode remains above a mode hop threshold temperature during a continuous write to plural data sectors, e.g., as shown by plot 412 of FIG. 4. However, pre-heating the laser diode during one or more revolutions immediately preceding a write operation incurs a performance loss in the disk drive since no data is written during the pre-heating. To minimize this performance loss, embodiments utilize a write caching method that optimizes a number of writes performed following a single pre-heat of a head in a disk drive.

Figure 6:
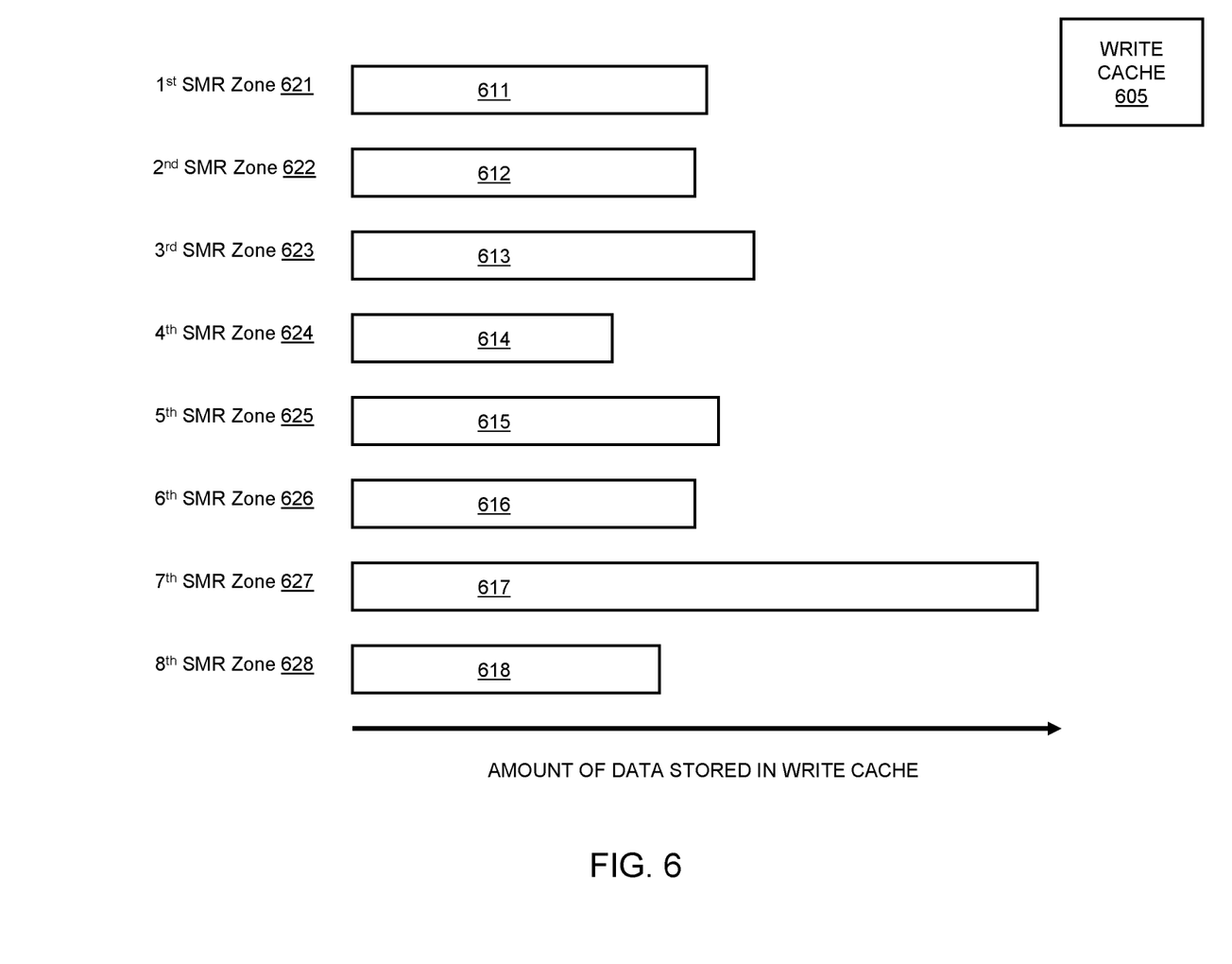
FIG. 6 illustrates aspects of an exemplary write caching method that optimizes a number of writes performed following a pre-heat of a head in a HAMR SMR disk drive in accordance with aspects of the present disclosure.

FIG. 6 illustrates aspects of an exemplary write caching method that optimizes a number of writes performed following a pre-heat of a head in a HAMR SMR disk drive in accordance with aspects of the present disclosure. In embodiments, disk drive 15 of FIG. 2A maintains a write cache 605 of write commands such as write commands received from host 44 of FIG. 2A. In embodiments, each write command comprises a command to write data to a respective one of plural SMR zones of disk drive 15. For example, control circuitry 22 of FIG. 2A may define plural SMR zones in disk drive 15, where each SMR zone comprises a unique band of tracks of disk drive 15. In this example, a write pointer is associated with each SMR zone, where the respective write pointer for a respective SMR zone indicates the next location (e.g., logical block address) in the respective SMR zone at which data will be written in the sequential manner used by SMR disk drives. In embodiments, caching circuitry 24 of FIG. 2A maintains respective measures of write commands stored in write cache 605 for respective SMR zones of disk drive 15, and caching circuitry 24 selects one of the respective SMR zones for a next pre-heat and continuous write operation based on the respective measures of the SMR zones.

FIG. 6 shows an example of a snapshot of measures 611-618 of write commands stored in write cache 605 and associated with eight SMR zones 621-628. Aspects of the present disclosure are described using eight SMR zones as an example; however, implementations are not limited to eight SMR zones, and other numbers of SMR zones may be used. Each of the measures 611-618 may be based on an aggregated volume of data of the write commands stored in write cache 605 for respective ones of the SMR zones 621-628. For example, write cache 605 may currently store 1000 write commands for SMR zone 621, and measure 611 may correspond to the aggregated amount of data that will be written to SMR zone 621 of disk drive 15 by these 1000 write commands. The respective values of the respective measures 611-618 may differ from one another at any given time since different SMR zones 621-628 may have different numbers of writes commands stored in write cache 605, and because the write commands may be associated with different amounts of data to be written to disk drive 15.

In embodiments, caching circuitry 24 updates the values of measures 611-618 periodically or on an as-needed basis. In one example, caching circuitry 24 updates the values of measures 611-618 by determining the value of each measure (e.g., by analyzing the write commands stored in write cache 605) periodically according to a predefined time interval, such as once every millisecond. In another example, caching circuitry 24 updates the values of measures 611-618 by maintaining a value of each measure and updating the value of a measure based on a change to write cache 605. In this example, when a new write command is received and stored in write cache 605, caching circuitry 24 determines one of SMR zones 621-628 with which this new write command is associated, and caching circuitry 24 updates the value of the measure of the determined one of the SMR zones 621-628 based on (e.g., by adding) the amount of data included in this new write command to the current value of the measure. In this manner, the values of measures 611-618 may change over time as new write commands are stored in write cache 605.

In accordance with aspects of the present disclosure, in response to a caching condition being satisfied, caching circuitry 24 selects the one of the SMR zones 621-628 having the largest measure 611-618 for the next write operation in disk drive 15. In the example of FIG. 6, caching circuitry 24 selects SMR zone 627 based on measure 617 being the largest of measures 611-618 (e.g., meaning that SMR zone 627 currently has the most data stored in write cache 605 of all SMR zones 621-628). In this example, in response to caching circuitry 24 selecting SMR zone 627 for the next write operation, control circuitry 22 performs a pre-heat operation of the laser diode in the one of the heads 18A-H associated with SMR zone 627 and, after pre-heating the laser diode associated with the selected SMR zone, control circuitry 22 performs a continuous write operation that writes at least a portion of the data stored in write cache 605 for SMR zone 627. In this manner, control circuitry 22, including caching circuitry 24, selects the SMR zone having the most data stored in write cache 605, performs a single pre-heat operation of the laser diode of the head associated with the selected SMR zone, and writes a portion of the data cached for the selected SMR zone following the single pre-heat. In some embodiments, the portion of the data comprises full tracks of data and may include essentially all the data cached for the selected SMR zone. In this manner, control circuitry 22, including caching circuitry 24, maximizes the amount of data written to disk drive 15 per single pre-heat operation, which advantageously improves the performance of disk drive 15 by reducing the frequency at which disk drive 15 performs pre-heat operations, while also avoiding mode hop by performing continuous write operations after the laser diode has been pre-heated to a steady state thermal condition.

In some embodiments, the caching condition includes one of the measures 611-618 exceeding an individual threshold. The individual threshold may be defined as an amount of data, such as 3 full tracks of data stored in write cache 605 for a particular one of the SMR zones 621-628. For example, in response to caching circuitry 24 determining a largest one of the measures 611-618 exceeds the individual threshold, caching circuitry 24 selects the respective one of the SMR zones 621-628 associated with the largest one of the measures 611-618. Control circuitry 22 then pre-heats the laser diode of the head associated with the selected the one of the SMR zones 621-628 to a steady state thermal condition. Control circuitry 22 then writes the cached data to data sectors of the disk in the selected the one of the SMR zones 621-628 in a continuous write operation while the laser diode is maintained in the steady state thermal condition.

In some embodiments, the caching condition includes a sum of all the measures 611-618 exceeding a combined threshold. The combined threshold may be defined as amount of data stored in write cache 605, such as 100% of the capacity of write cache 605 or some other predefined percentage. For example, in response to caching circuitry 24 determining a sum of all the measures 611-618 exceeds the combined threshold, caching circuitry 24 selects the respective one of the SMR zones 621-628 associated with the largest one of the measures 611-618. Control circuitry 22 then pre-heats the laser diode of the head associated with the selected the one of the SMR zones 621-628 to a steady state thermal condition. Control circuitry 22 then writes the cached data to data sectors of the disk in the selected the one of the SMR zones 621-628 in a continuous write operation while the laser diode is maintained in the steady state thermal condition.

In some embodiments, the caching condition includes disk drive 15 having excess writing capacity. Excess writing capacity may be defined as the disk drive currently not performing any write operations, even though the none of measures 811-812 exceeds the individual threshold and even though the sum of all measures 811-812 does not exceed the combined threshold. For example, in response to caching circuitry 24 determining disk drive 15 has excess writing capacity, caching circuitry 24 selects the respective one of the SMR zones 621-628 associated with the largest one of the measures 611-618. Control circuitry 22 then pre-heats the laser diode of the head associated with the selected the one of the SMR zones 621-628 to a steady state thermal condition. Control circuitry 22 then writes the cached data to data sectors of the disk in the selected the one of the SMR zones 621-628 in a continuous write operation while the laser diode is maintained in the steady state thermal condition.

In implementations, control circuitry 22 performs a pre-heat operation of the laser diode of the head associated with the selected SMR zone by heating the laser diode to a steady state thermal condition above a mode hop threshold temperature. The heating may be performed using conventional or later-developed heating techniques. In one example, control circuitry 22 pre-heats the laser diode by applying a current to the laser diode so that the laser diode self-heats until its temperature reaches a steady state thermal condition above the mode hop threshold temperature. In one example, control circuitry 22 performs the pre-heat operation for a predefined amount of time, such as one revolution of the disk. In another example, control circuitry 22 performs the pre-heat operation for an amount of time that is determined using a function of an amount of current applied to the laser diode and an environmental (e.g., internal) temperature of the disk drive. In another example, control circuitry 22 performs the pre-heat operation until a detected temperature of the laser diode (e.g., detected using a temperature sensor) reaches the steady state thermal condition. Control circuitry 22 may be configured to pre-heat the laser diode only while the laser diode travels over data sectors containing no data or invalid data.

In embodiments, after the laser diode is pre-heated to the steady state thermal condition, control circuitry 22 writes to the disk at least a portion of the data stored in the write cache for the selected SMR zone in a continuous write operation. As used herein, a continuous write operation comprises concatenating plural write operations from write cache 605 into a single sequential write operation in the selected SMR zone. By writing the data in a continuous write operation after the laser diode is pre-heated to the steady state thermal condition, the temperature of the laser diode remains above the mode hop threshold temperature during the entirety of the continuous write operation, e.g., similar to plot 412 of FIG. 4. In this manner, the data for plural write commands is written using only a single pre-heat operation and mode hop is avoided during the continuous write operation.

In some embodiments, after the laser diode is pre-heated to the steady state thermal condition, control circuitry 22 writes to the disk essentially all the data stored in the write cache for the selected SMR zone in a continuous write operation. In accordance with aspects of the present disclosure, writing essentially all the data stored in write cache 605 for the selected SMR zone comprises sequentially writing to the disk a largest portion of the data stored in write cache 605 for the selected SMR up to an end of track boundary of the selected SMR zone. For example, if the selected SMR zone has an amount of data in write cache 605 that would fill the data sectors in 1.2 tracks on the disk, then control circuitry 22 writes a subset of this data to fill the data sectors in the next 1 tracks of the selected SMR zone on the disk and leaves the remaining data in write cache 605 to be written the next time this SMR zone is selected. In another example, if the selected SMR zone has an amount of data in write cache 605 that would fill the data sectors in 2.9 tracks on the disk, then control circuitry 22 writes a subset of this data to fill the data sectors in the next 2 tracks of the selected SMR zone on the disk and leaves the remaining data in write cache 605 to be written the next time this SMR zone is selected.

In another example, if the selected SMR zone has an amount of data in write cache 605 that would fill the data sectors in 3.6 tracks on the disk, then control circuitry 22 writes a subset of this data to fill the data sectors in the next 3 tracks of the selected SMR zone on the disk and leaves the remaining data in write cache 605 to be written the next time this SMR zone is selected. In this manner, the continuous write operation to the selected SMR zone writes data from the cache to the disk in full-track portions, such that the continuous write operation always ends at an end of track boundary with a next track in the selected SMR zone containing no data or only invalid data. As a result, the next time this SMR zone is selected by the caching circuitry 24, the write pointer for this SMR zone will be located at the beginning of a track containing no data or invalid data, referred to as a first full track downstream in this SMR zone. As such, the next time this SMR zone is selected by the caching circuitry 24, that the control circuitry 22 may perform the pre-heat operation of the laser diode over all the data sectors of the first full track downstream in this SMR zone without concern of damaging data in any of these data sectors.

In embodiments, after control circuitry 22 writes to the disk a portion of the data stored in the write cache for the selected SMR zone, caching circuitry 24 adjusts the measure of the selected SMR zone to reflect the amount of data remaining in write cache 605 for the selected SMR zone. All write commands that were performed as part of the continuous write operation to the selected SMR zone are removed from write cache 605, while all write commands that were not performed as part of the continuous write operation to the selected SMR zone remain stored in write cache 605. In embodiments, caching circuitry 24 adjusts the measure of the selected SMR zone to reflect the amount of data associated with the write commands still stored in write cache 605 for the selected SMR zone. Caching circuitry 24 may also adjust the measure of the selected SMR zone to reflect an amount of data associated with new write commands received from host 44 and stored in write cache 605 while control circuitry 22 was performing the continuous write operation to the selected SMR zone.

In some embodiments, control circuitry 22 limits a number of open SMR zones in disk drive 15 to a number less than a maximum possible number of open SMR zones for disk drive 15. For example, disk drive 15 may be configurable to have as many as 128 open SMR zones; however, control circuitry 22 may limit the number of open SMR zones to 8 for a well-behaved host. Limiting the number of open SMR zones in this manner guarantees that the selected SMR zone, when selected using the individual threshold condition or the combined threshold condition, will have a sufficient amount of data stored in write cache 605 to realize the performance benefit of reducing the frequency of pre-heat operations in the disk drive.

In an illustrative example, disk drive 15 may be capable of having 128 open SMR zones, but control circuitry may limit this number to 16 open SMR zones. In this example, with a write cache of 128 MB, this would allocate an average of 8 MB (or about 4 tracks) of write cache to each SMR zone. In this example, when either the individual threshold condition or the combined threshold condition is satisfied, the selected one of the SMR zones is guaranteed to have, at a minimum, an amount of data stored in write cache 605 that will fill about 4 tracks on a disk. In this example, in typical operational conditions, when either the individual threshold condition or the combined threshold condition is satisfied, the selected one of the SMR zones will more likely have two times that amount of data, i.e., an amount of data stored in write cache 605 that will fill about 8 tracks on a disk. In this manner, by limiting the number of open SMR zones, control circuitry 22 increases the amount of data written per each pre-heat and continuous write operation cycle, which improves the performance of the disk drive by reducing the frequency of pre-heating.

In one embodiments, caching circuitry 24 selects the next one of the SMR zones based on a combination of factors including: the measure of data stored in write cache for each SMR zone; and an amount of time associated with the write operation for each SMR zone. In this embodiment, control circuitry 22 or caching circuitry 24 may utilize a rotational positional optimization (RPO) algorithm to determine a respective amount of time associated with a write operation to write the portion of the data stored in the write cache and associated with a respective one of the SMR zones for each respective one of the SMR zones. The respective amount of time associated with such a write operation for a respective one of the SMR zones may be based on parameters including but not limited to: (i) a seek time including an amount of time a head of the disk drive seeks to a target track of the disk at which to begin the write operation; (ii) a rotate to target time including an amount of time the head tracks over the target track to a target data sector (i.e., the data sector at the beginning of the write operation); (iii) a rotate through target time including an amount of time to write the data to the disk after starting the write operation at the target data sector (i.e., the time for writing to the disk the portion of the data stored in the write cache for this SMR zone); and (iv) a pre-heat time including an amount of time spent pre-heating the laser diode prior to starting the write operation. Different combinations of these parameters may be used in different embodiments for determining the amount of time associated with a write operation for one of the SMR zones. In one example, the amount of time associated with a write operation for one of the SMR zones includes seek time, rotate to target time, rotate through target time, and pre-heat time. In another example, the amount of time associated with a write operation for one of the SMR zones includes seek time, rotate to target time, and pre-heat time. In yet another example, the amount of time associated with a write operation for one of the SMR zones includes seek time and rotate to target time. Different combinations of these parameters and/or other parameters may be used based on the desired performance characteristics of the disk drive. In this manner, caching circuitry 24 may select the next SMR zone by selecting one of the SMR zones that has the largest ratio of amount of data stored in the write cache to an amount of time associated with writing the amount of data to the data storage device.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface of a corresponding disk among the one or more disks; and
   one or more processing devices, individually or in combination, configured to:
   maintain respective measures of write commands associated with respective ones of shingled magnetic recording (SMR) zones defined in the data storage device, wherein data associated with the write commands is stored in a write cache associated with the data storage device;
   select one of the SMR zones based on the respective measures;
   perform a pre-heat operation of a laser diode included in a head associated with the selected one of the SMR zones; and
   perform a continuous write operation in the selected one of the SMR zones following the pre-heat operation, wherein the continuous write operation writes at least a portion of data stored in the write cache associated with the selected one of the SMR zones.

2. The data storage device of claim 1, wherein the respective measures comprise respective amounts of the data stored in the write cache and associated with respective ones of the SMR zones.

3. The data storage device of claim 2, wherein the selecting comprises selecting one of the SMR zones that has a largest amount of data stored in the write cache.

4. The data storage device of claim 2, wherein the selecting comprises selecting one of the SMR zones that has a largest ratio of amount of data stored in the write cache to an amount of time associated with writing the amount of data to the one the of the one or more disks.

5. The data storage device of claim 2, wherein the selecting is performed based on determining a caching condition is satisfied.

6. The data storage device of claim 5, wherein the caching condition comprises one of:
- a respective amount of data stored in the write cache and associated with a respective one of the SMR zones exceeds an individual threshold;
- a sum of respective amounts of data stored in the write cache for all the SMR zones exceeds a combined threshold; or
- the data storage device has excess write capacity.

7. The data storage device of claim 1, wherein the performing the pre-heat operation of the laser diode raises a temperature of the laser diode to a steady state thermal condition corresponding to a mode hop resistant temperature.

8. The data storage device of claim 7, wherein the temperature of the laser diode avoids crossing a mode hop threshold temperature while the laser diode is in the steady state thermal condition.

9. The data storage device of claim 1, wherein the portion of the data stored in the write cache and associated with the selected one of the SMR zones comprises a largest portion of the data stored in the write cache and associated with the selected one of the SMR zones that ends at an end of track boundary in the selected one of the SMR zones.

10. The data storage device of claim 1, wherein a number of the SMR zones is limited to less than a maximum number of SMR zones associated with the data storage device.

11. A method comprising:
- maintaining respective measures of write commands associated with respective ones of shingled magnetic recording (SMR) zones defined in a data storage device, wherein data associated with the write commands is stored in a write cache associated with the data storage device;
- selecting one of the SMR zones based on the respective measures;
- performing a pre-heat operation of a laser diode included in a head associated with the selected one of the SMR zones; and
- performing a continuous write operation in the selected one of the SMR zones following the pre-heat operation, wherein the continuous write operation writes at least a portion of data stored in the write cache associated with the selected one of the SMR zones,
- wherein the maintaining, the selecting, the performing the pre-heat operation, and the performing the continuous write operation are performed by one or more processing devices individually or in combination.

12. The method of claim 11, wherein the respective measures comprise respective amounts of data stored in the write cache and associated with respective ones of the SMR zones.

13. The method of claim 12, wherein the selecting comprises selecting one of the SMR zones that has a largest amount of data stored in the write cache.

14. The method of claim 12, wherein the selecting comprises selecting one of the SMR zones that has a largest ratio of amount of data stored in the write cache to an amount of time associated with writing the amount of data to the disk.

15. The method of claim 12, wherein the selecting is performed based on determining a caching condition is satisfied, wherein the caching condition comprises one of:
- a respective amount of data stored in the write cache and associated with a respective one of the SMR zones exceeds an individual threshold;
- a sum of respective amounts of data stored in the write cache for all the SMR zones exceeds a combined threshold; or
- the data storage device has excess write capacity.

16. The method of claim 11, wherein the performing the pre-heat operation of the laser diode raises a temperature of the laser diode to a steady state thermal condition corresponding to a mode hop resistant temperature.

17. One or more processing devices comprising, individually or in combination:
- means for maintaining respective measures of write commands associated with respective ones of shingled magnetic recording (SMR) zones defined in a data storage device, wherein data associated with the write commands is stored in a write cache associated with the data storage device;
- means for selecting one of the SMR zones based on the respective measures;
- means for performing a pre-heat operation of a laser diode included in a head associated with the selected one of the SMR zones; and
- means for performing a continuous write operation in the selected one of the SMR zones following the pre-heat operation, wherein the continuous write operation writes at least a portion of data stored in the write cache associated with the selected one of the SMR zones.

18. The one or more processing devices of claim 17, wherein:
- the respective measures comprise respective amounts of data stored in the write cache and associated with respective ones of the SMR zones; and
- the selecting comprises selecting one of the SMR zones that has a largest amount of data stored in the write cache.

19. The one or more processing devices of claim 17, wherein the performing the pre-heat operation of the laser diode raises a temperature of the laser diode to a steady state thermal condition in which the temperature of the laser diode avoids crossing a mode hop threshold temperature during the continuous write operation.

20. The one or more processing devices of claim 17, wherein a number of the SMR zones is limited to less than a maximum number of SMR zones associated with the data storage device.

* * * * *